UNITED STATES PATENT OFFICE.

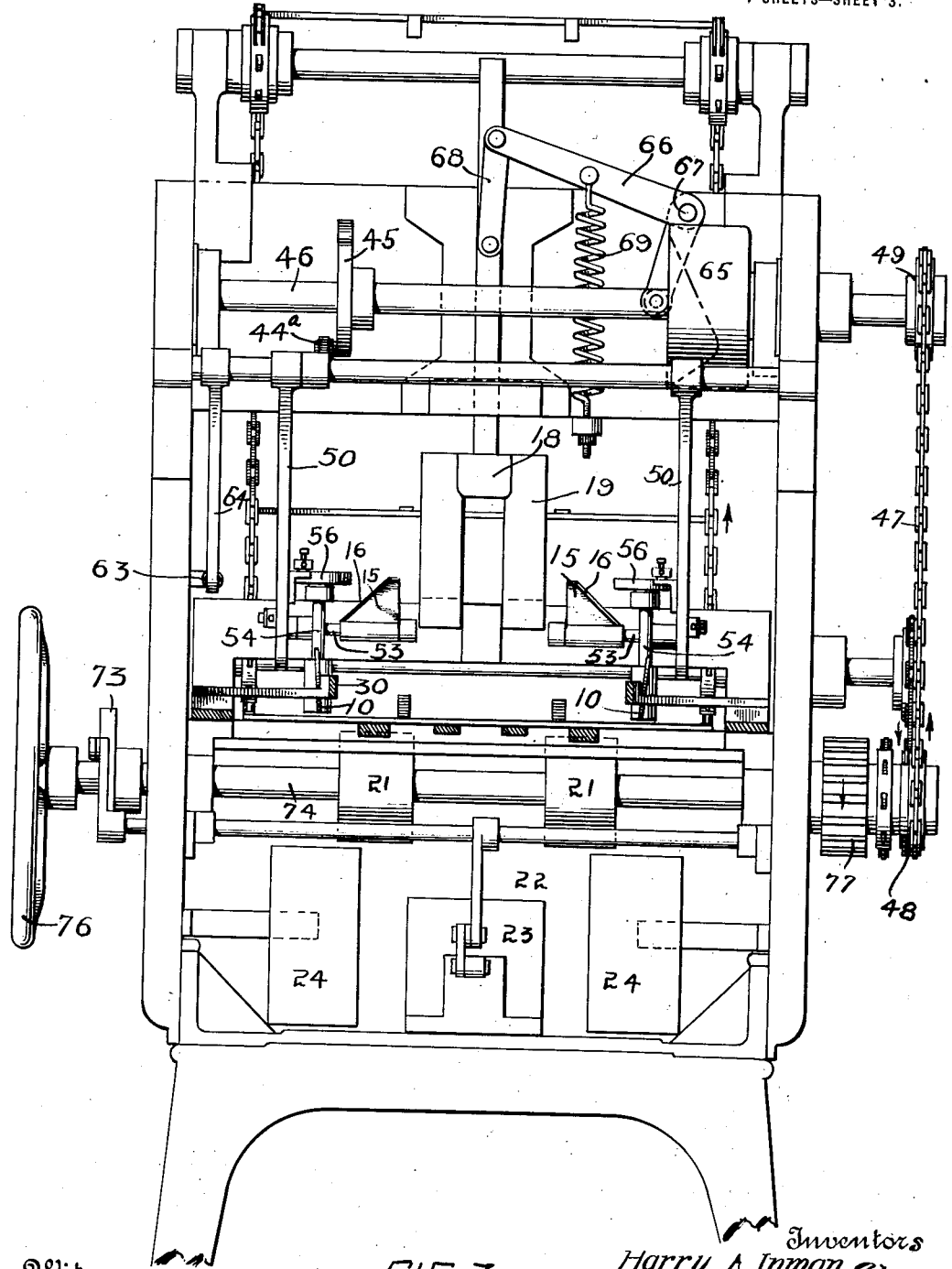

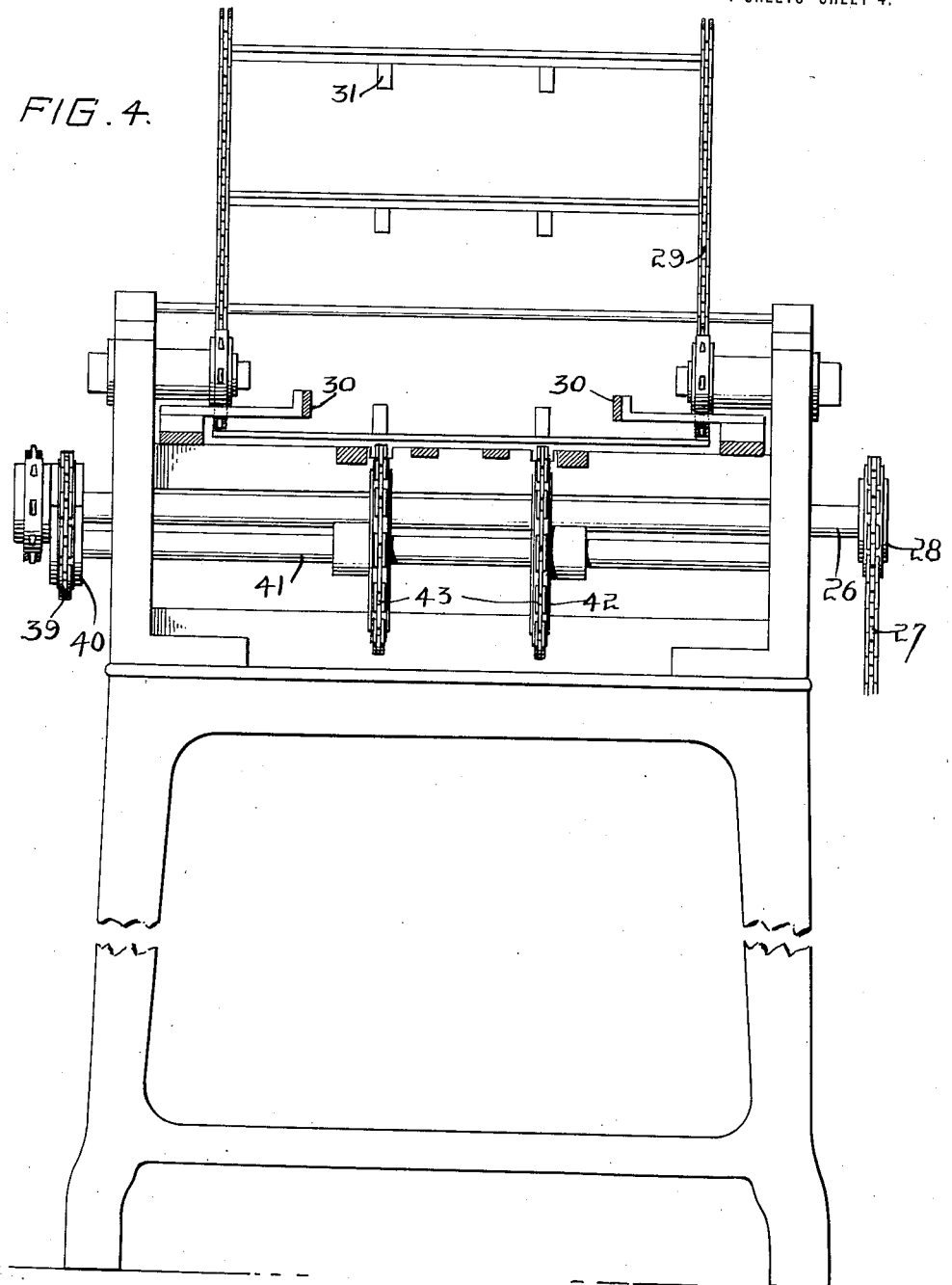

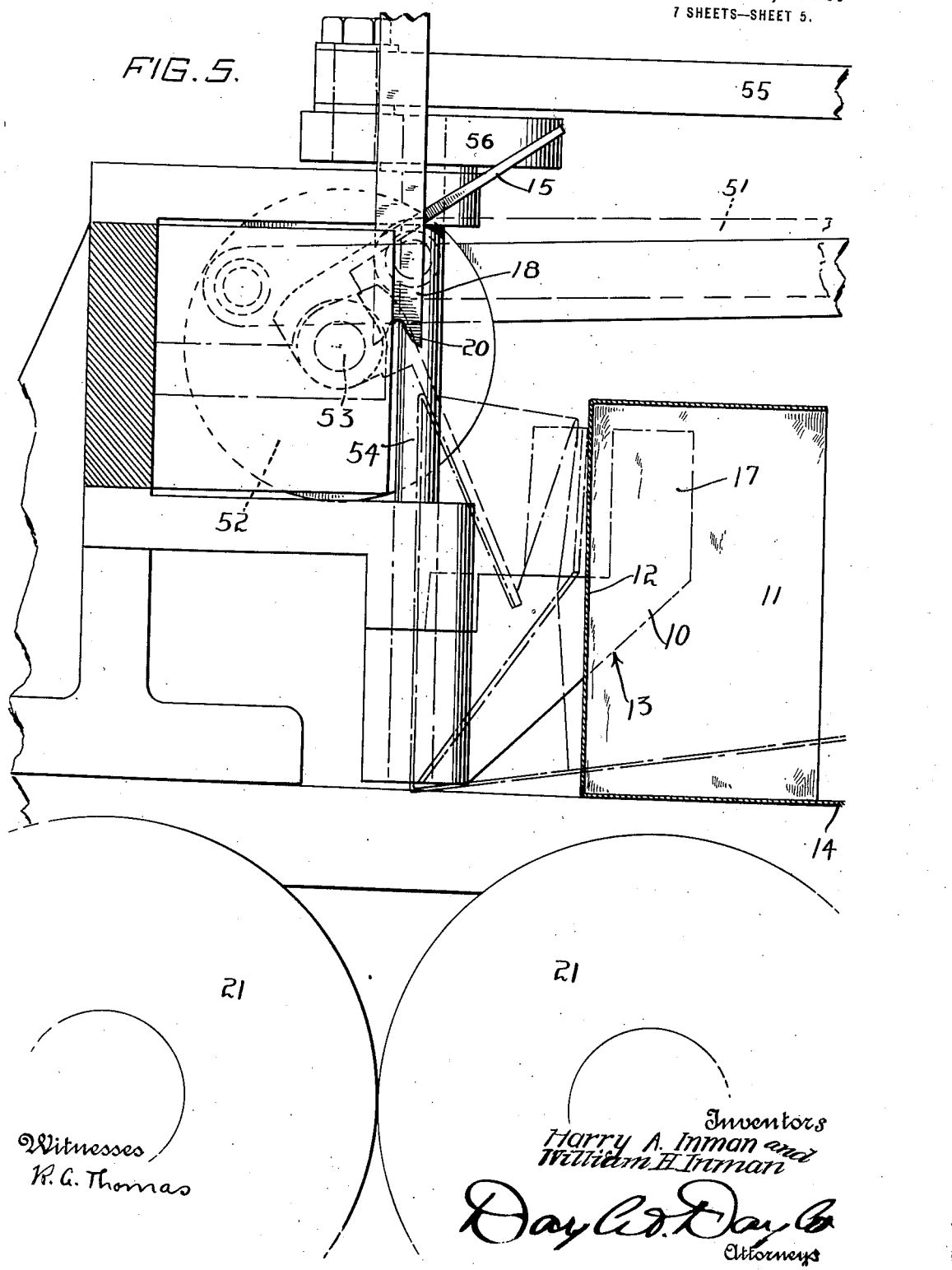

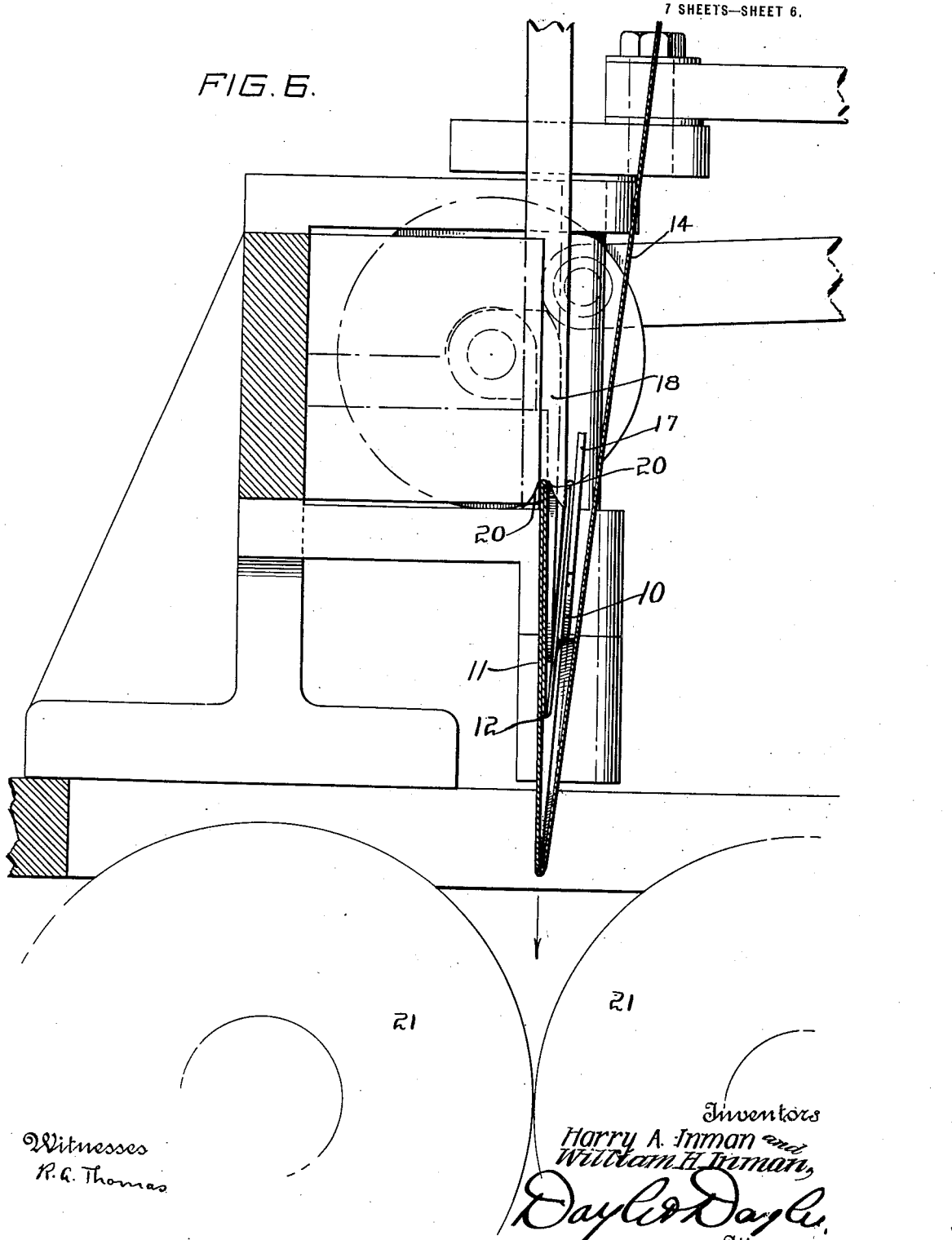

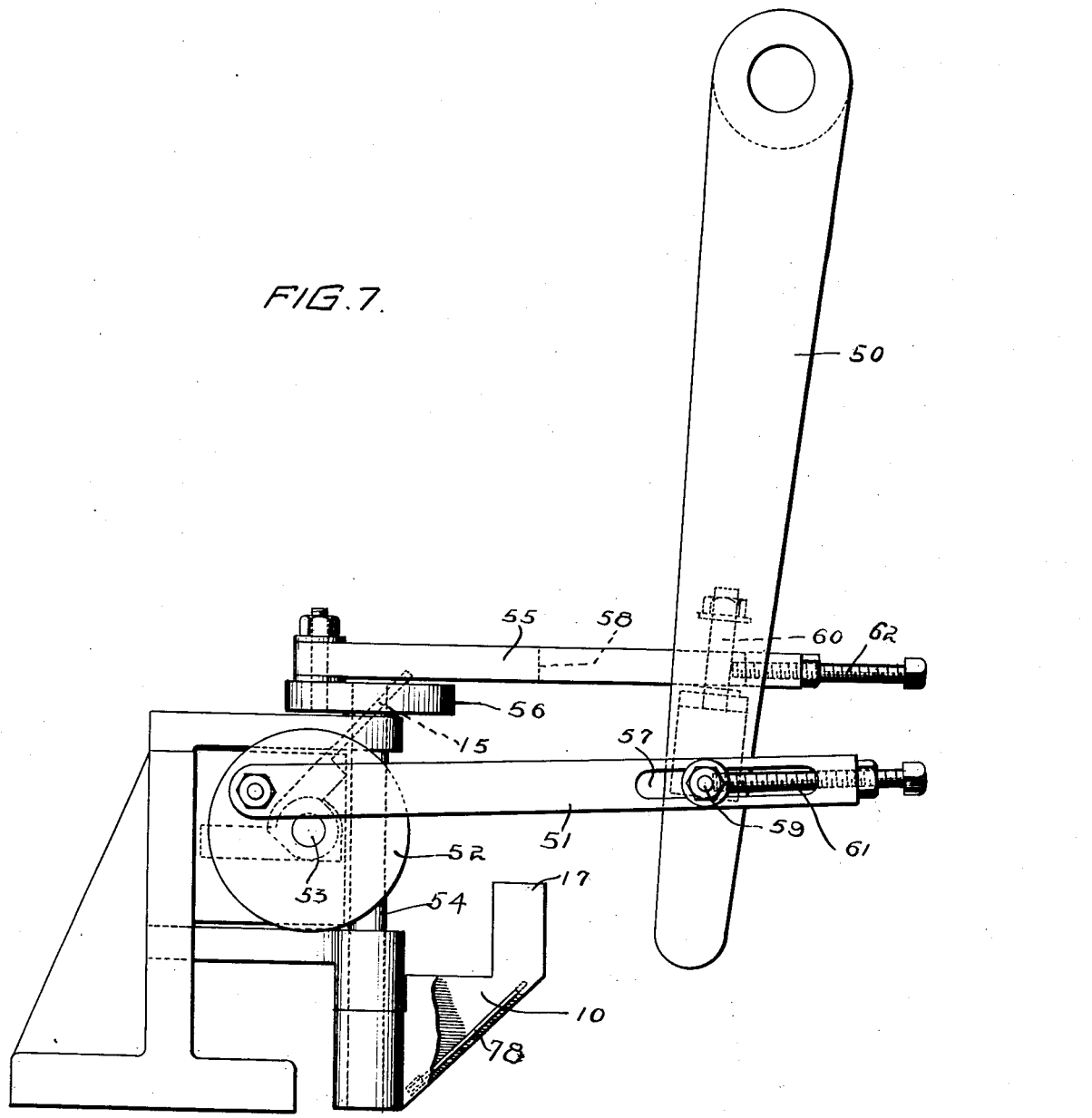

HARRY A. INMAN AND WILLIAM H. INMAN, OF AMSTERDAM, NEW YORK.

BOX FOLDING AND STACKING MACHINE.

1,355,398.  Specification of Letters Patent.  Patented Oct. 12, 1920.

Application filed December 1, 1917. Serial No. 204,981.

*To all whom it may concern:*

Be it known that we, HARRY A. INMAN and WILLIAM H. INMAN, citizens of the United States, residing at Amsterdam, in the county of Montgomery and State of New York, have invented a certain new and useful Box Folding and Stacking Machine, of which the following is a specification.

The object of the invention is to provide a machine for receiving paper or cardboard boxes such, for example, as those used for transporting and shipping eggs and similar products, folding and stacking the same in compact form for shipment to the producer.

Further objects and advantages of the invention will appear in the course of the following description, it being understood that changes in form, proportion and details may be resorted to within the scope of the claims without departing from the spirit of the invention.

In the drawings—

Fig. 3 is a vertical section on the plane indicated by the line 3—3 of Fig. 1.

Fig. 4 is a vertical sectional view on the plane indicated by the line 4—4 of Fig. 2.

Fig. 5 is a detail side view of the folding and creasing device showing the parts in the position which they occupy as the box approaches the same.

Fig. 6 is a similar view showing the box in its folded condition as it is being advanced to the creasing rollers.

Fig. 7 is an enlarged detail of the front wall folding elements.

Figure 1:
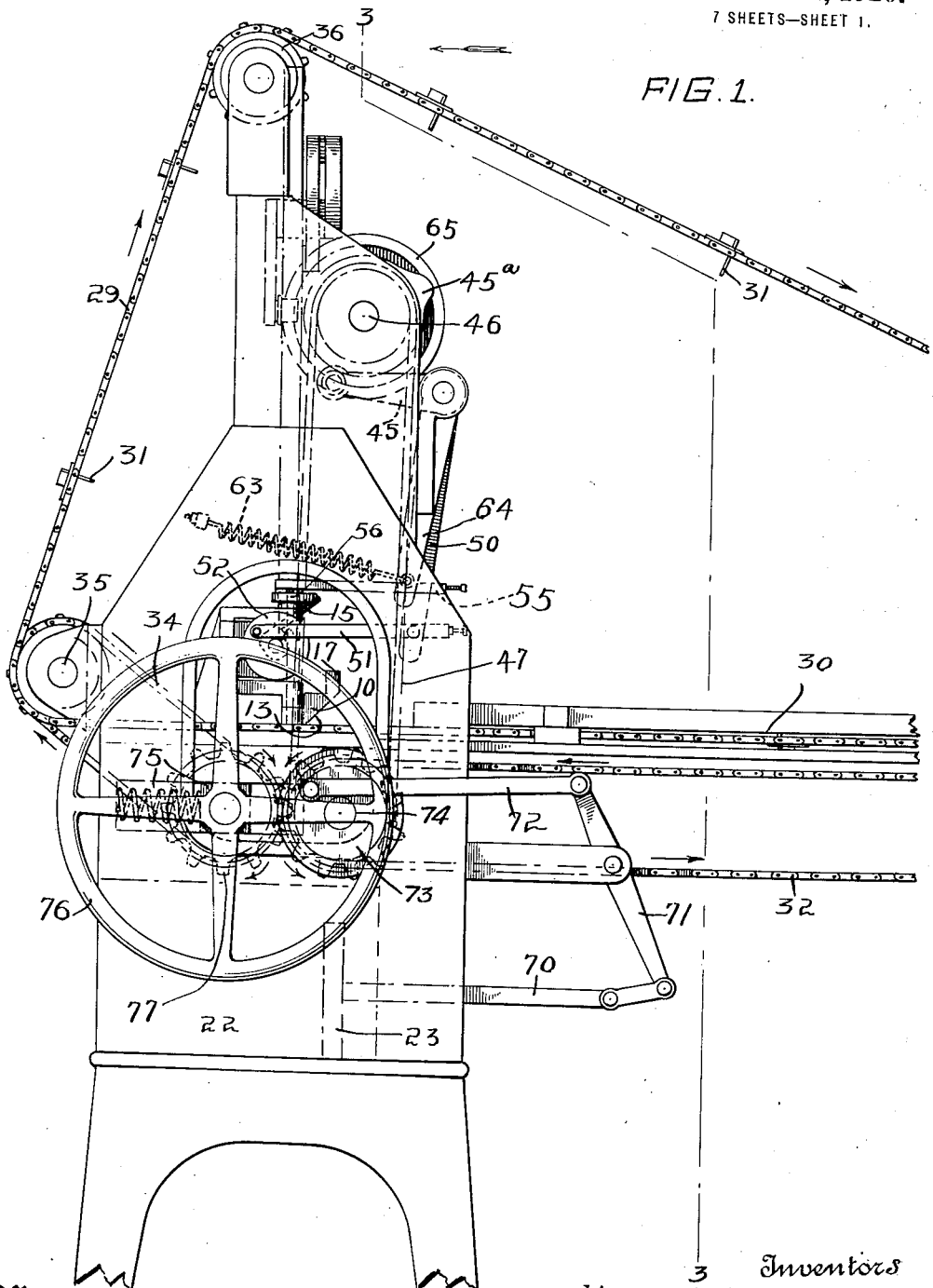
Figure 1 is a side view of a portion of the machine.
Figure 2:
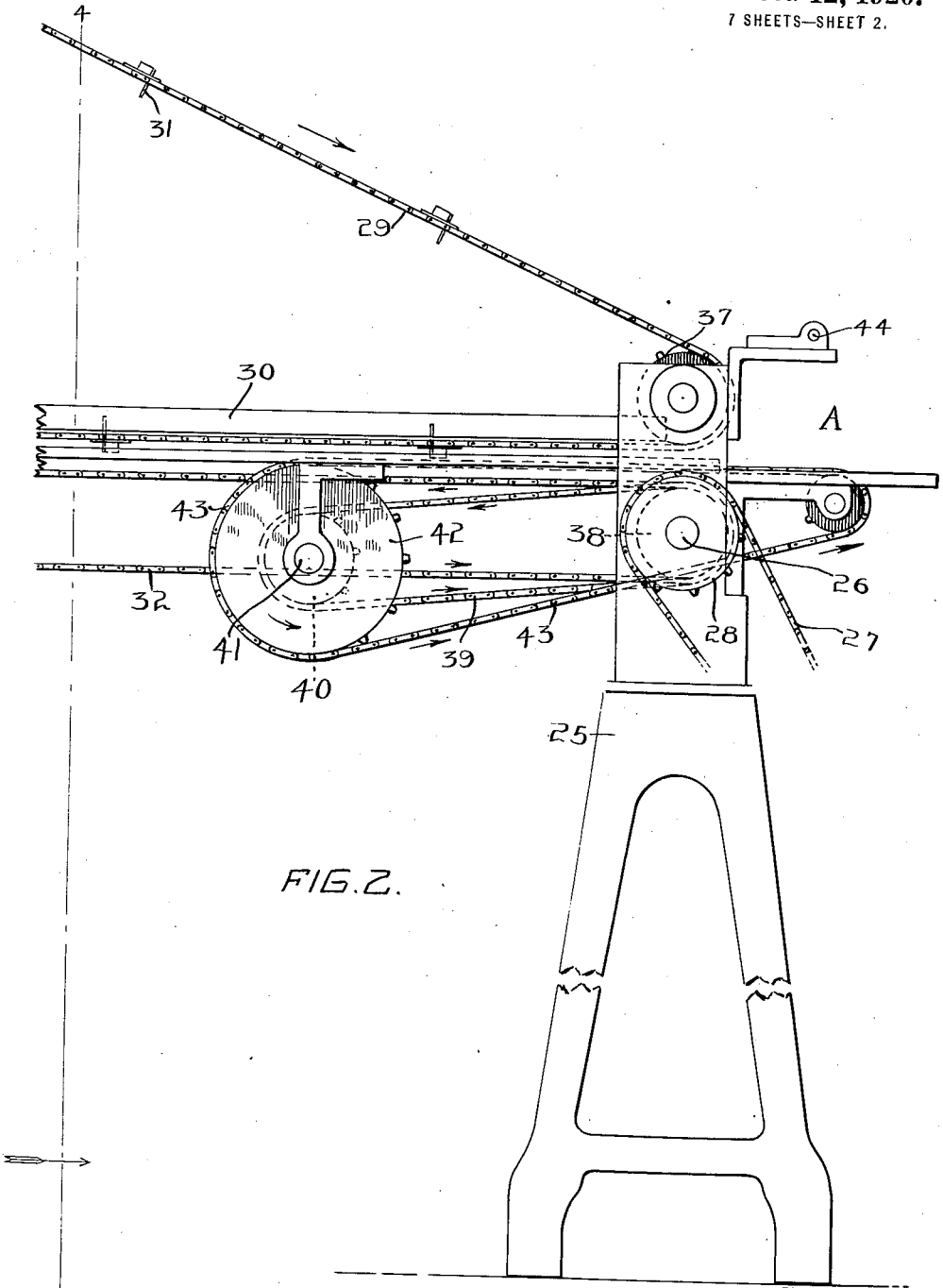
Fig. 2 is a side view forming a continuation of Fig. 1.

In the illustrated embodiment of the invention the machine consists essentially of folding wings or members, so disposed and operated as to engage the walls of a box and fold them upon predetermined crease lines toward the plane of the bottom of the box, so that the box with its bottom, side and end walls and top or cover may be arranged in parallel planes to be stacked or arranged in bundles or packages for shipment under the most convenient and economical conditions; a creasing device for receiving the folded boxes successively and compacting the walls thereof so that they may be arranged in the smallest possible space; a conveyer mechanism for feeding the boxes to the folding wings or elements; and a stacking device for receiving the folded and creased boxes from the creasing mechanism and holding them until they can be removed and tied or otherwise packed in bundles.

As illustrated the folding elements include wings 10 which engage opposite walls of the box 11, fed thereto by means hereinafter described, said wings being operated to swing inwardly or toward each other so as to cause the inward folding of the engaged box walls to occupy planes parallel with the plane of the bottom wall 12 of the box, said wings having inclined or diagonally disposed edges 13 which establish a crease line extending from the box corner, formed by the intersecting side and end walls and the bottom, inwardly toward the center of the width of the box. Obviously the inward folding of these opposite walls which, as illustrated, are the end walls of the box, causes the upward folding of the intermediate side wall of the box and, when said side wall carries the top or cover 14, as shown, the indicated manipulation of the box correspondingly causes the swinging of said top or cover toward a plane parallel with the box bottom.

Preferably the box is subjected to more than one set of folding elements, and as illustrated the side wall, or as it may be termed the front wall, is engaged by folding elements in addition to those serving to operate on the opposite end walls, this additional folding element consisting of wings 15, also having diagonally disposed crease line edges 16 and being operated to fold the said side or front wall inwardly toward the plane of the bottom wall, slightly in advance of the inward folding of the wings 10, so that the end walls of the box overlap the folded front or side wall, while the end walls in turn are covered by the opposite side or back wall to which the cover or lid is attached, as more clearly indicated in Fig. 6. The primary or end wall folding wings are formed with extensions 17 which overlap the side wall folding wings 15, when the parts are in the folding position, with an interval between the folding elements permitting of the operation of a plunger 18 mounted in suitable guides 19 and having a bifurcated or notched face 20 to engage the edge of the folded box, as also shown in Fig. 5, and advance the latter sufficiently to be engaged by the creasing rolls 21. These rolls are adapted to rotate continuously and carry the folded box into a stacking chamber 22 where it is engaged by a follower 23 and moved forward to pass yielding detents 24, said follower being mounted for reciprocatory movement and being actuated by means hereinafter explained. When a sufficient number of the boxes has been stored the same may be removed and tied in bundles for shipment to the consumer.

It will be obvious that various means may be employed for actuating the above described parts of the mechanism, but in order that the same may be properly timed to operate in proper relations, and in order that the boxes coming from the box forming mechanism may be received and positioned and advanced properly to the folding elements it has been found expedient to employ devices constructed and arranged substantially along the following lines:

On a suitable framework 25 is arranged a drive shaft 26 to which motion may be communicated by a chain 27 and sprocket wheel 28, and from which motion is communicated to a carrier chain 29, the lower run of which operates in connection with a guide 30, said chain being provided at intervals with flights 31 for successively engaging the boxes and moving them along the guide or runway 30 to the folding means. Motion is communicated directly from the drive shaft 26 through an endless chain 32 to a countershaft and from thence through suitable gears, sprockets and a chain 34 to a countershaft 35 which is traversed by the carrier chain 29 in common with sprockets 36 and 37.

In order to properly position the boxes as they are introduced into the machine and to distribute the same so that there may be no interference and no possibility of a flight of the carrier chain coming in contact with a side wall of the box, and thus crushing or otherwise mutilating the same, there is employed a distributing or spacing mechanism consisting of a speeding device, operated from the drive shaft and consisting of a sprocket wheel 38 traversed by the chain 39 which also traverses a sprocket wheel 40 on a countershaft 41 carrying a sprocket wheel 42 of larger diameter and which in turn is utilized to actuate a feed chain 43 which operates in such a relation to the box guide or runway as to engage the boxes successively and move them rapidly from the point of entrance to the machine, which is indicated at A, and carry the same along the guide or runway for a sufficient distance to insure the proper engagement thereof by a flight of the carrier chain.

Disposed at the feed end of the machine there is a trip bar or rod 44 extending transversely across the path of boxes entering the machine so that if a box is presented to the machine in an upstanding position, the first action thereon, when engaged by the feeding device, is to turn it down into a position indicated in Fig. 5 with the lid or cover lying flat on the guide or runway. The box is advanced in this position by the feeding device 70 and is then engaged at the edge of its lid or cover by a flight of the carrier chain, and is moved by the latter until it reaches a position within range of movement of the folding elements which have already been described.

The preferred means for actuating the folding elements include a rocker having an arm 44$^a$ disposed terminally in operative relation with a cam 45, the shaft 46 of which is driven by a chain 47 traversing sprocket wheels 48 and 49, while the arm 50, also forming a part of the rocker, and which may be duplicated as shown, is connected by a link 51 with a disk 52 on the rocking spindle 53 of the auxiliary folding wing 15, which as before described is constructed of separate elements, spaced apart laterally to permit the plunger 18 to pass therebetween. The main folding wings, which have spindles 54 at right angles to the spindles 53, are operated from the same rocker through the arms 50, links 55 and disks 56. There is an adjustable or timing tappet relation between the rocker and each set of folding elements, which may be secured by slotting the links 51 and 55, as at 57 and 58, to receive pins 59 and 60 for engagement with adjustable stops consisting of bolts 61 and 62. The rocker is yieldingly held in its inoperative position by a spring 63 connected with an arm 64.

The plunger may be actuated in timed relation with the other parts by a cam 65 acting on one arm of a bell crank lever 66, fulcrumed at 67 and having its other arm connected with the plunger by link 68, a spring 69 being used to move the lever in the opposite direction.

Also, the follower may be operated in timed relation by connecting its stem 70 with a rocker 71 receiving motion through link 72 from a disk 73 on the spindle 74 of one of the rolls 21, the spindle of the other roll being mounted in spring cushioned bearing blocks 75 to maintain a yielding relation between the rolls. A hand wheel 76 on the spindle of one roll, which is geared as at 77 to the spindle of the other roll, permits of the manual setting of the various parts of the mechanism in the proper positions before applying the power.

It will be noted that when both the main and auxiliary folding elements are employed, the former to fold inwardly the opposite (end) walls and the latter to fold inwardly the intermediate (side or front) wall, the action of the auxiliary elements should slightly precede that of the main elements, so that the latter fold upon the former to cause the opposite box walls to overlap the intermediate wall, whereby the folded box may be advanced edgewise, out of engagement with the folders, or stripped therefrom, by means of the plunger 18 or its equivalent while the folding elements remain in the folding position. By adjusting the stops 61 and 62 the desired relations between the operations of these parts may be secured with precision.

Also, in order to insure smooth and even folding and prevent buckling in forming the crease lines, which are later made positive or permanent by the creasing or compressing rolls, the folding wings, or one set of them, such as the main wings 10, may be provided with cushioning means such as yielding presser wires 78 which come in contact with box walls slightly in advance of the main body of the wings.

Having described the invention what we claim is:

1. A box folding machine having sets of folding elements for consecutive actuation and means for operating the same including a rocker having an arm, links connecting the arm with said sets of elements and tappet connections between the arm and said links and consisting of tappet pins on the arm, adjustable stops on said links, the latter being slotted for the reception of the tappet pins, and means for discharging and packing the folded boxes.

2. A box folding machine having a folding mechanism, a guide-way leading to the folding mechanism, an endless conveyer having flights traversing the guide-way, an endless feeder also traversing said guide-way at its entrance, a box positioning trip at the guide-way entrance, and means for operating the conveyer and feeder at different speeds.

This specification signed and witnessed this 17th day of September, A. D. 1917.

HARRY A. INMAN.
WILLIAM H. INMAN.

Witnesses:
FRED S. SMITH,
FRANK LENNBEKER.